United States Patent
Lee

(10) Patent No.: US 8,010,266 B2
(45) Date of Patent: Aug. 30, 2011

(54) SYSTEM AND METHOD FOR CONTROLLING THRUST FORCE OF BELT OF CONTINUOUSLY VARIABLE TRANSMISSION

(75) Inventor: Ho Wook Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 330 days.

(21) Appl. No.: 12/273,045

(22) Filed: Nov. 18, 2008

(65) Prior Publication Data

US 2009/0287384 A1    Nov. 19, 2009

(30) Foreign Application Priority Data

May 19, 2008    (KR) .................... 10-2008-0046249

(51) Int. Cl.
*G06F 17/00* (2006.01)
(52) U.S. Cl. .................. 701/65; 701/80; 701/51
(58) Field of Classification Search .......... 701/51, 701/65, 61, 80; 477/45, 180; 474/28
See application file for complete search history.

(56) References Cited

U.S. PATENT DOCUMENTS

| 4,651,290 A * | 3/1987 | Masaki et al. ................ 701/80 |
| 2004/0209732 A1* | 10/2004 | Eguchi et al. ................ 477/44 |
| 2006/0136111 A1* | 6/2006 | Robert et al. ................ 701/65 |
| 2008/0255736 A1* | 10/2008 | Braswell et al. ................ 701/50 |
| 2009/0043468 A1* | 2/2009 | Kondo et al. ................ 701/61 |

FOREIGN PATENT DOCUMENTS

JP        2003-269591 A    9/2003

* cited by examiner

*Primary Examiner* — Thomas G Black
*Assistant Examiner* — Marthe Marc Coleman
(74) *Attorney, Agent, or Firm* — Edwards Angell Palmer & Dodge LLP; Peter F. Corless

(57) ABSTRACT

The present invention relates to a system and a method for controlling the thrust force of a belt of a CVT. The method includes: determining whether a rough road condition is satisfied; continuously calculating, in a case that the condition is satisfied, a thrust force for a first predetermined time by gradually increasing a safety factor to a safety factor of the rough road condition; increasing the thrust force of the belt to the calculated thrust force; and maintaining the thrust force according to the safety factor of the rough road condition for a second predetermined time. With that method, belt slip can be prevented and fuel efficiency can be improved.

9 Claims, 2 Drawing Sheets

SYSTEM AND METHOD FOR CONTROLLING THRUST FORCE OF BELT OF CONTINUOUSLY VARIABLE TRANSMISSION

CROSS-REFERENCE TO RELATED APPLICATION

This application claims priority to and the benefit of Korean Patent Application No. 10-2008-0046249 filed in the Korean Intellectual Property Office on May 19, 2008, the entire contents of which are incorporated herein by reference.

BACKGROUND (a) Technical Field

The present invention relates to a system and a method for controlling the thrust force of a belt of a continuously variable transmission (CVT) that can prevent the belt from slipping and improve fuel efficiency.

(b) Related Art

In case of a CVT, speed ratios are continuously changed within a specific range. Currently, a CVT is mainly used in hybrid vehicles. According to typical hybrid vehicles, a first planetary gear set is disposed on a first shaft, a second planetary gear set is disposed on a second shaft disposed in parallel to the first shaft, and a third shaft disposed in parallel to the second shaft is connected to an output shaft.

An engine is mounted on the first shaft and is connected to one operating member of the first planetary gear set, and the first motor/generator is mounted on the first shaft and is connected to another operating member of the first planetary gear set. In addition, the second motor/generator is mounted on the second shaft and is connected to one operating member of the second planetary gear set, and the third shaft is connected to another operating member of the second planetary gear set.

Further, the other operating members of the first and second planetary gear sets are respectively connected to first and second pulleys, and the first and second pulleys are connected to each other by a belt such that torque of the first shaft is transmitted to the second shaft. Accordingly, a shift to a target speed ratio is continuously performed by using engine torque and motor torque.

Since torque is transmitted by frictional force between the belt and the pulley, it is important to predict the force that the belt applies to the pulley (thrust force). That is, if the thrust force is excessive, power delivery efficiency and fuel mileage may be reduced.

In addition, even if a vehicle drives with a suitable thrust force, road torque may be transmitted from the output shaft when the vehicle is running on a rough road, thereby causing belt slip.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a system and a method for controlling the thrust force of a belt of a CVT having advantages of preventing belt slip and enhancing fuel mileage by controlling the thrust force of the belt according to a road condition.

In one aspect, the present invention provides a system for controlling the thrust force of a belt of a CVT, which includes: a road condition determiner for determining a road condition; a safety factor calculator for calculating a safety factor according to the determined road condition; a thrust force calculator for calculating a thrust force of a belt of the CVT based on the calculated safety factor; and a controller for controlling the thrust force of the belt according to the calculated thrust force.

In another aspect, the present invention provides a method for controlling the thrust force of a belt of a CVT, which includes: determining whether a rough road condition is satisfied; continuously calculating, in a case that the rough road condition is satisfied, a thrust force for a first predetermined time by gradually increasing a safety factor to a safety factor of the rough road condition; increasing the thrust force of the belt to the calculated thrust force; and maintaining the thrust force according to the safety factor of the rough road condition for a second predetermined time.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

DETAILED DESCRIPTION OF THE EMBODIMENTS

An exemplary embodiment of the present invention will hereinafter be described in detail with reference to the accompanying drawings.

Figure 1:
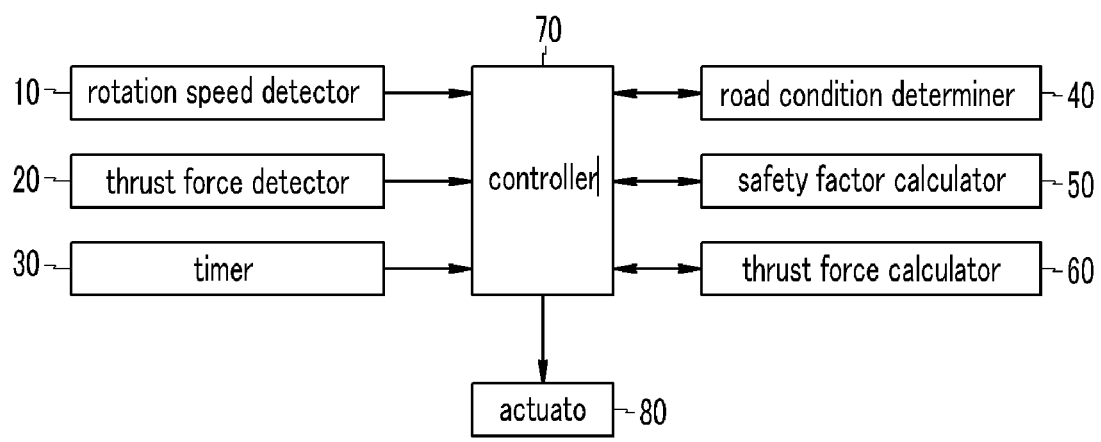
FIG. 1 is a block diagram of a system for controlling thrust force of a belt of a continuously variable transmission according to an exemplary embodiment of the present invention.

FIG. 1 is a block diagram of a system for controlling the thrust force of a belt of a CVT according to an exemplary embodiment of the present invention.

As shown in FIG. 1, the system includes a rotation speed detector 10, a thrust force detector 20, a timer 30, a road condition determiner 40, a safety factor calculator 50, a thrust force calculator 60, a controller 70, and an actuator 80.

The rotation speed detector 10 detects the rotation speed of a CVT and transmits a signal corresponding thereto to the controller 70. The rotation speed detector 10 may be mounted at various positions. For example, it may be mounted at a front portion of the CVT so as to detect input speed of the CVT or may be mounted at a rear portion of the CVT so as to detect output speed of the CVT. In addition, the rotation speed detector 10 may be mounted at a wheel and may calculate the rotation speed of the CVT based on rotation speed of the wheel.

The thrust force detector 20 may be mounted at any place where it is convenient for detecting the thrust force of the belt. For example, it may be mounted on the actuator 80. The thrust force detector 20 detects the belt thrust force and transmits a signal corresponding thereto to the controller 70.

The timer 30, which may be turned on or turned off according to control of the controller 70, detects elapsed time for which the timer 30 is turned on, and transmits a signal corresponding thereto to the controller 70.

The road condition determiner 40 determines whether a road condition satisfies a rough road condition or a normal road condition by using the rotation speed of the CVT detected by the rotation speed detector 10. Information on the road condition determined by the road condition determiner 40 is transmitted to the controller 70.

The safety factor calculator 50 calculates a safety factor according to the road condition determined by the road condition determiner 40. Here, the safety factor includes a safety factor corresponding to a normal road condition and safety factor corresponding to a rough road condition. In addition, the respective safety factors may be set according to road states under each condition, and the safety factor according to a normal road condition may be set as a constant value. The safety factor calculated by the safety factor calculator 50 is transmitted to the controller 70.

The thrust force calculator 60 calculates a thrust force of the belt based on the safety factor calculated by the safety factor calculator 50. Initially, a thrust force required for delivering engine torque and motor torque is calculated. The calculated thrust force is then multiplied by the safety factor calculated by the safety factor calculator 50 to calculate the thrust force of the belt. Information on the thrust force of the belt is transmitted to the controller 70.

The controller 70 can be realized by one or more processors activated by a predetermined program, and the predetermined program can be programmed to perform each step of a method for controlling thrust force of a belt of a continuously variable transmission according to an embodiment of this invention.

The controller 70 receives signals from the rotation speed detector 10, the thrust force detector 20, and the timer 30. In addition, the controller 70 receives information on the road condition, the safety factor, and the thrust force of the belt respectively from the road condition determiner 40, the safety factor calculator 50, and the thrust force calculator 60, and generates a control signal for driving the actuator 80.

The actuator 80 receives the control signal from the controller 70 and applies the thrust force to the belt. The actuator 80 may be driven by various types of power source. Examples of the power source include hydraulic pressure or pneumatic pressure, or may be an electric motor or a step motor.

Figure 2:
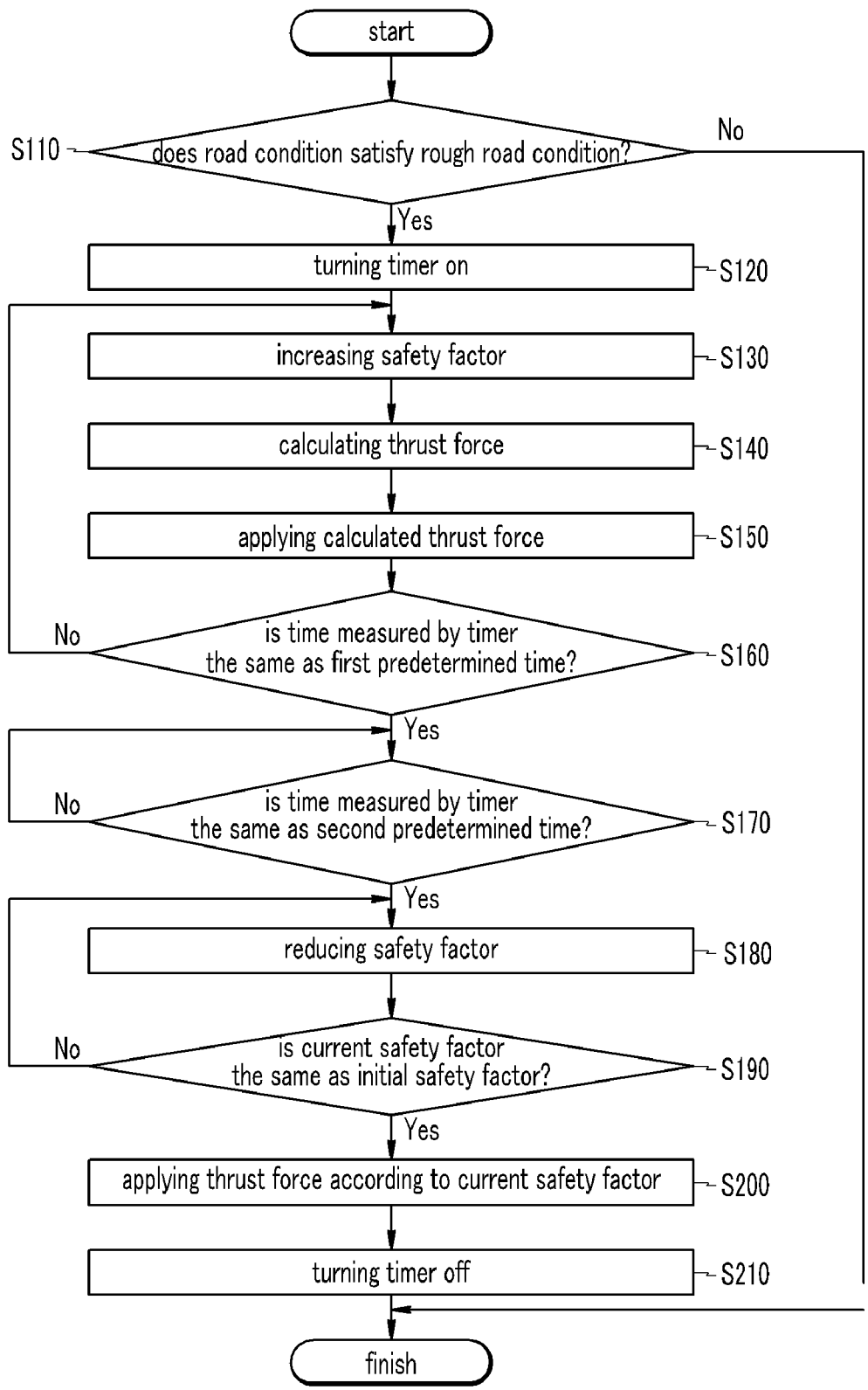
FIG. 2 is a flowchart of a method for controlling thrust force of a belt of a continuously variable transmission according to an exemplary embodiment of the present invention.

FIG. 2 is a flowchart of a method for controlling thrust force of a belt of a continuously variable transmission according to an exemplary embodiment of the present invention.

As shown in FIG. 2, in the driving state of a vehicle, the road condition determiner 40 determines whether a road condition satisfies a rough road condition at step S110. The rough road condition is satisfied when the absolute value of the rate of change in the rotation speed of the CVT is a predetermined value or a higher in a predetermined frequency or higher for a predetermined period. The predetermined value, the predetermined frequency, and the predetermined period can vary according to a design scheme.

In addition, the road condition determiner 40 can determine the road condition according to a rate of change in rotation speed of the CVT and a frequency in which the rate change is within a specific range.

If the road condition does not satisfy the rough road condition, the method for controlling the belt thrust force is finished. Here, it is exemplarily shown that the method for controlling the belt thrust force is finished in a case that the road condition is a normal road condition. However, even where the road condition is a normal road condition, the safety factor and the thrust force can be calculated according to states of the road and the actuator 80 can be driven according to the calculated thrust force, as described below. In addition, the safety factor and the thrust force can be calculated according to each road condition determined by the road condition determiner 40.

If the road condition satisfies the rough road condition, the controller 70 turns the timer 30 on at step S120, and the safety factor calculator 50 calculates the safety factor according to the rough road condition. The safety factor according to the rough road condition may be set according to a frequency in which the absolute value of the change rate in the rotation speed of the transmission larger than or equal to a predetermined value for a predetermined period. Alternatively, the safety factor according to the rough road condition may be set as a specific value.

After that, the controller 70 gradually increases the safety factor to the calculated safety factor according to the rough road condition at step S130, and the thrust force calculator 60 continuously calculates a thrust force according to the safety factor at step S140. In addition, the controller 70 drives the actuator 80 so as to apply the calculated thrust force to the belt at step S150.

The safety factor is controlled to be increased to the calculated safety factor according to the rough road condition for a first predetermined time. That is, the controller 70 determines whether a time measured by the timer 30 is the same as the first predetermined time at step S160.

If the time measured by the timer 30 is different from the first predetermined time, steps S130 to S150 are repeatedly performed.

If the time measured by the timer 30 is the same as the first predetermined time, the controller 70 controls the thrust force calculated based on the safety factor according to the rough road condition to be maintained for a second predetermined time. That is, the controller 70 determines whether a time measured by the timer 30 after the first predetermined time is the same as the second predetermined time at step S170. The first and second predetermined times can be set according to a design scheme and they can be identical or different.

If the time measured by the timer 30 after the first predetermined time is different from the second predetermined time, the controller 70 maintains the thrust force while checking the timer 30.

If the time measured by the timer 30 after the first predetermined time is the same as the second predetermined time, the controller 70 reduces the safety factor at step S180. The safety factor may be reduced sharply or gradually. For instance, the safety factor is sharply reduced for enhancing fuel mileage, and the safety factor is gradually reduced for dynamic driving. The reduction of the safety factor can be arbitrarily set by a person of ordinary skill in the art.

After that, the controller 70 determines whether a current safety factor is the same as an initial safety factor at step S190.

If the current safety factor is different from the initial safety factor, the step S180 is continuously performed. If the current safety factor is the same as the initial safety factor, the controller 70 drives the actuator 80 to apply the thrust force according to the current safety factor to the belt at step S200.

After that, the controller 70 turns the timer 30 off at step S210.

Meanwhile, control methods according to the road condition determined by the road condition determiner 40 may be stored at the controller 70. According to the control methods, the safety factor may be changed to the predetermined safety factor sharply or gradually such as when the rough road condition occurs.

According to the present invention, since it is determined whether the road condition satisfies the rough road condition and the thrust force of the belt is controlled according to the road condition, belt slip may be prevented.

In addition, fuel mileage may be enhanced as a consequence of applying suitable thrust force according to the road condition.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for controlling the thrust force of a belt of a continuously variable transmission (CVT), comprising:
   a road condition determiner for determining a road condition;
   a safety factor calculator for calculating a safety factor according to the determined road condition;
   a thrust force calculator for calculating a thrust force of a belt of the CVT based on the calculated safety factor; and
   a controller for controlling the thrust force of the belt according to the calculated thrust force,
   wherein the road condition determiner determines the road condition is a rough road condition when the absolute value of a rate of change in rotation speed of the CVT is a predetermined value or a higher in a predetermined frequency or higher for a predetermined period, and
   the thrust force calculator calculates the thrust force continuously for a first predetermined time by gradually increasing the safety factor to a safety factor calculated by the safety factor calculator when the road condition is the rough road condition.

2. The system of claim 1, wherein the road condition determiner determines the road condition according to a rate of change in rotation speed of the CVT and a frequency in which the rate change is within a specific range.

3. The system of claim 1, wherein the safety factor of the rough road condition is set according to a frequency in which the absolute value of the change rate in the rotation speed of the transmission larger than or equal to a predetermined value for a predetermined period.

4. The system of claim 3, wherein the controller maintains the thrust force of the belt calculated based on the safety factor of the rough road condition for a second predetermined time.

5. A method for controlling the thrust force of a belt of a continuously variable transmission (CVT), comprising:
   determining whether a rough road condition is satisfied;
   continuously calculating, in a case that the rough road condition is satisfied, a thrust force for a first predetermined time by gradually increasing a safety factor to a safety factor of the rough road condition;
   increasing the thrust force of the belt to the calculated thrust force with a controller unit; and
   maintaining the thrust force according to the safety factor of the rough road condition for a second predetermined time.

6. The method of claim 5, wherein the rough road condition is satisfied when the absolute value of a rate of change in rotation speed of the CVT is a predetermined value or a higher in a predetermined frequency or higher for a predetermined period.

7. The method of claim 5, wherein the safety factor of the rough road condition is set according to a frequency in which the absolute value of the change rate in the rotation speed of the transmission larger than or equal to a predetermined value for a predetermined period.

8. The method of claim 5, further comprises reducing the safety factor to an initial safety factor after lapse of the second predetermined time.

9. A system for controlling the thrust force of a belt of a continuously variable transmission (CVT), comprising:
   a road condition determiner for determining a road condition;
   a safety factor calculator for calculating a safety factor according to the determined road condition;
   a thrust force calculator for calculating a thrust force of a belt of the CVT based on the calculated safety factor; and
   a controller for controlling the thrust force of the belt according to the calculated thrust force,
   wherein the thrust force calculator calculates the thrust force continuously for a first predetermined time by gradually increasing the safety factor to a safety factor calculated by the safety factor calculator when the road condition is the rough road condition.

* * * * *